United States Patent

Schanz

[11] Patent Number: 5,853,271
[45] Date of Patent: Dec. 29, 1998

[54] ROTATING SHAFT TOOL

[75] Inventor: Gerhard Schanz, Burladingen, Germany

[73] Assignee: August Back GmbH & Co., Germany

[21] Appl. No.: 753,639

[22] Filed: Nov. 27, 1996

[30] Foreign Application Priority Data

Nov. 29, 1995 [DE] Germany ................ 195 44 556.2

[51] Int. Cl.⁶ .................................................. B23B 51/00
[52] U.S. Cl. .......................... 408/146; 407/38; 407/73; 407/92; 408/191; 408/192
[58] Field of Search ............................ 408/146, 189, 408/191, 192, 197; 407/36, 38, 39, 44, 73, 76, 77, 85, 86, 88, 92, 97

[56] References Cited

U.S. PATENT DOCUMENTS

| 1,779,059 | 10/1930 | Burkart et al. .......................... 407/86 |
|---|---|---|
| 3,024,674 | 3/1962 | Judd .......................................... 408/147 |
| 3,087,359 | 4/1963 | Cogsdill .................................. 408/714 |
| 4,606,108 | 8/1986 | Davis ......................................... 407/36 |
| 4,775,268 | 10/1988 | Michalon ................................ 408/714 |
| 5,391,023 | 2/1995 | Basteck .................................. 408/146 |

*Primary Examiner*—Steven C. Bishop

[57] ABSTRACT

A rotating shaft tool has a base body, with a guide slot in the base body, in which at least one elongate cutting blade can be arranged. An axial adjustment means which can be arranged at the mouth of the guide slot and by means of which the cutting blade can be adjusted axially in the guide slot. At least one spherical force exerting element, capable of moving the cutting blade in the axial direction, can be arranged at one end face of the cutting blade. Its axial displacement can be adjusted by means of at least one second force exerting element which deviates from the direction of movement of the first spherical force exerting element.

22 Claims, 3 Drawing Sheets

ROTATING SHAFT TOOL

BACKGROUND OF THE INVENTION

1. Field of the Invention

The invention relates to a rotating shaft tool and more particularly to a rotating shaft tool having a guide slot in which an elongated cutting blade can be arranged.

2. Discussion of Prior Art

A rotating shaft tool of this kind is known from U.S. Pat. No. 5,391,023, and is constructed as a machine reamer. In this machine reamer, a blade is guided in a guide slot of a base body and is supported at one end on a bolt-like axial adjustment means. The axial adjustment means consists of a hollow cylindrical stop bolt, the slotted bolt head of which can be expanded radially by means of a countersunk-head screw, so that the blade supported thereon is pushed, with a sensitive adjustment, in the direction which is radial of the bolt axis. A precise axial displacement is thereby made possible.

However, because of the conical flank of the countersunk head of a countersunk-head screw, such an axial adjustment means is limited in radial expansion, and thus in the axial displacement, to a relatively small adjustment path.

SUMMARY OF THE INVENTION

The object of the present invention is to provide a rotating shaft tool of the kind described, which makes possible a sensitive, precise adjustment of the blade in the longitudinal direction of the guide slot, and also an enlargement of the adjustment range.

This object is attained according to the invention by a body having a guide slot in which at least one elongated cutting blade can be arranged. An axial adjustment device is arranged at the mouth of the guide slot by means of which the cutting blade can be adjusted axially in the guide slot. The axial adjustment device includes at least a first force exerting element with at least one rounded contact surface positioned towards an end face of the cutting blade for moving the cutting blade in an axial direction, and at least one second force exerting element for adjusting the first force exerting element, which second force exerting element deviates from the direction of movement of the first force exerting element.

The first force exerting element which engages one end face of the cutting blade with an at least partially curved or rounded contact surface can be adjusted with a second force exerting element which is directly accessible from the exterior, so that a substantially enlarged adjustment range can be given by the arrangement of the first force exerting element in a guide section which borders on the guide slot. A defined point-like seating can be given by the rounded design of the contact surface, by means of which an axial displacement can take place with defined force transmission properties, which have exclusively an axial force component. During the operation of the axial adjustment device, the blade can remain lightly clamped in the guide slot, so that its position can be directly monitored with a measuring probe during the adjustment. Moreover, the arrangement according to the invention has the advantage that a use-specific arrangement for shaft tools can be provided by the deviation of the direction of motion of the second force exerting element from the first force exerting element, and makes possible an easily accessible setting from the exterior.

According to an advantageous embodiment of the invention, the first force exerting element is formed in a spherical shape. Only very small frictional losses appear because of this, so that an easily accessible and finely set axial adjustment can be given. Moreover, the embodiment and arrangement of a spherical force exerting element according to the invention has the advantage that the size of the adjustment range can be given by the size of the spherical construction. The axial adjustment range is only slightly smaller than the diameter of the spherical force exerting element, in order to assure that the spherical force exerting element can be kept in its guide when the axial adjustment is a maximum.

According to a further advantageous embodiment of the invention, it is provided that the first force exerting element is provided as a force exerting element in the form of a pin, with a rounded contact surface towards the end surface of the cutting blade. The size of the adjustment range can be further enlarged by this means.

According to a further advantageous embodiment of the invention, an introduction of force between the first force exerting element and the second force exerting element can be provided in a range between 1° and 90°; preferably, a range less than or equal to 45° is provided. Favorable transmission properties can thus be obtained, in which the axial advance of the second force exerting element can transmit in the same proportion to the axial adjustment of the cutting blade. It is furthermore advantageous in this particular embodiment that the axial force exerting device is provided substantially at right angles to the substantially axial direction of adjustment of the spherical force exerting element. The second force exerting element can thereby be guided radially outward and can be made easily accessible from the exterior. In dependence on the diameter of the base body, the second force exerting element can be given a suitable length, so that a simple axial adjustment can be maintained which is easily accessible from the exterior.

According to a further advantageous embodiment of the invention, the first force exerting element is provided in a guide which is slightly inclined inward relative to a rotation axis. During axial adjustment the blade is adjusted only axially in the guide slot, without the cutting blade, which is lightly clamped in the guide slot, being able to deviate radially outward.

According to a further advantageous embodiment of the invention, the end face of the blade has an angle of less than 90° to the floor of the guide slot. The inward inclined arrangement of the guide slot prevents radially outward deviation of the blade that remains lightly clamped in the guide slot during axial adjustment. Alternatively, both of the advantageous embodiments can also be provided, according to which an inward-inclined guide of the spherical force exerting element acts on an end face of the blade, which is arranged at an angle of less than 90° to the floor of the guide slot.

BRIEF DESCRIPTION OF THE DRAWINGS

Preferred embodiments of the present invention will now be described, taken together with the drawings, in which.

DETAILED DESCRIPTION OF PREFERRED EMBODIMENTS

Figure 1:
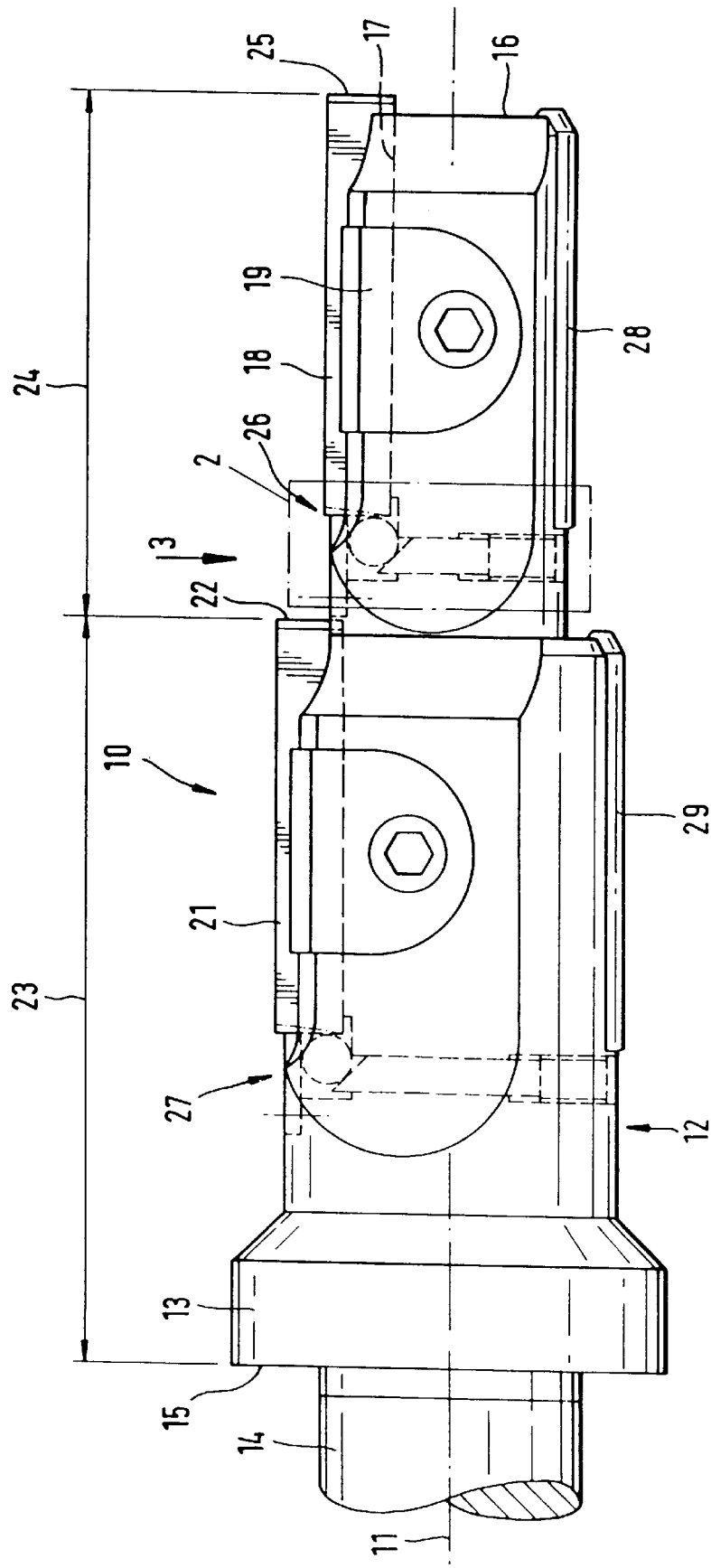
FIG. 1 shows a schematic side view of a front region of a step reamer according to the invention.

The rotating shaft tool 10 according to FIG. 1, constructed as a step reamer, has in a manner which is known per se a cylindrical base body 12 which is coaxial with a geometrical longitudinal axis 11 or rotation axis 11, and which has on the left a stop collar 13 and a chucking shaft 14. The stop collar 13 has an end annular surface 15 on the shaft side, serving to align the reamer in a defined axial position relative to a machine boring head.

A guide slot 17 which runs parallel to the rotation axis 11 and which opens towards the right-hand end surface 16 is formed in the base body 12, and in it a lamellar blade 18 is guided and is fixed with a clamping lug 19. This structure is known per se and needs no further explanation. In the embodiment, a second blade 21 of the same kind is mounted in the same manner in a middle region of the base body 12. The two blades 18, 21 are to illustrate the importance of the axial adjustment.

Thus the right-hand cutting edge 22 of the blade 21 has a predetermined distance 23 from the end annular surface 15 and a further, predetermined distance 24 to the right-hand cutting edge 25 of the blade 18. These distances are to be maintained precisely, and this makes it clear why an axial adjustment device 26, 27 is required for both blades.

However, it is also necessary to set the distance 23 in the case that only one blade 21 is present, when the reamer is clamped in a defined position by means of the stop collar 13. In a machine reamer without such a positioning device, it can finally be important to set the cutting edges 22 or 25 with respect to the front ends of guide bars 28 or 29, in particular when the blade is to be resharpened.

Figure 2:
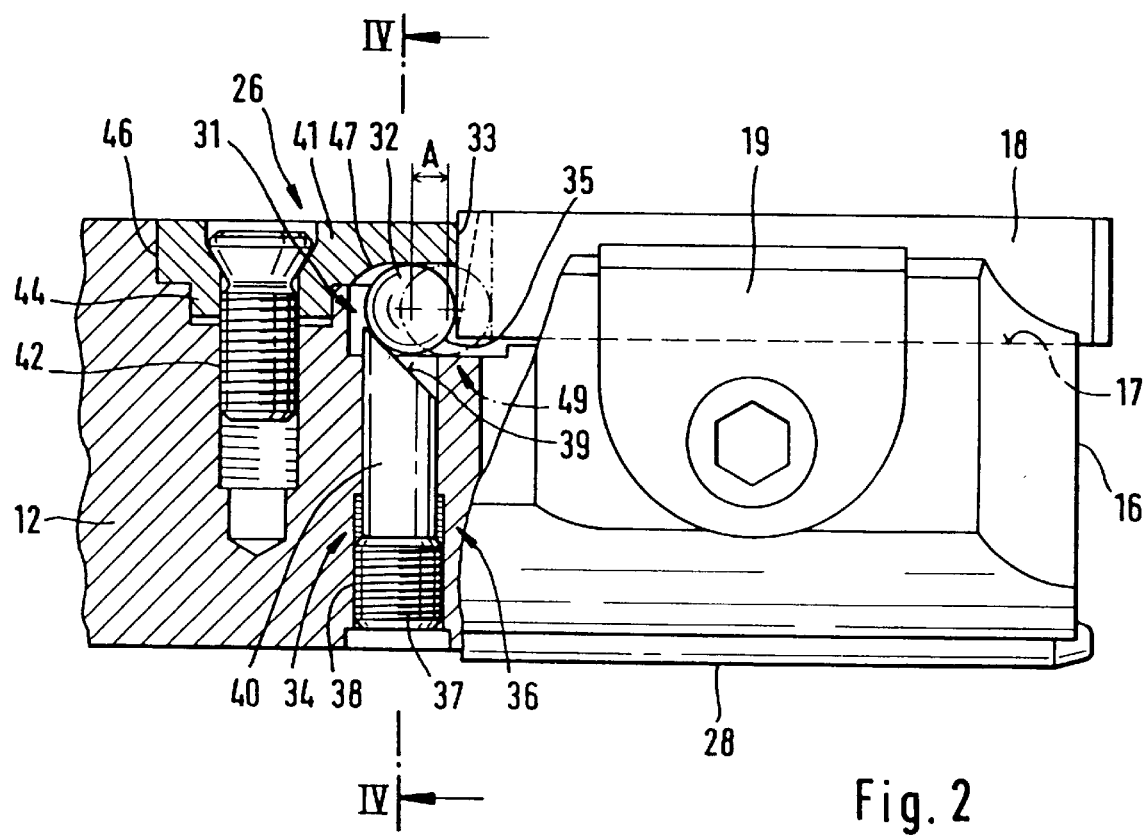
FIG. 2 shows an enlarged illustration of the region 2 of FIG. 1.
Figure 4:
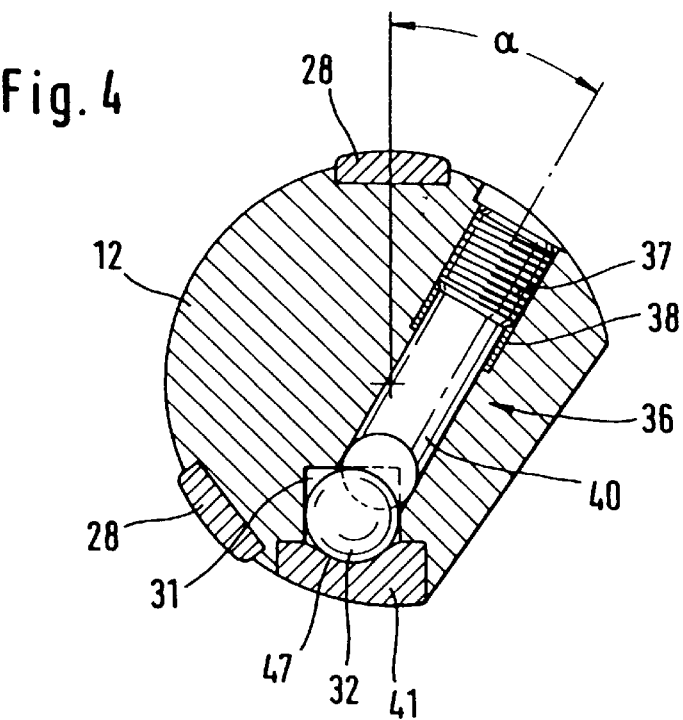
FIG. 4 shows a schematic sectional view according to the line IV—IV in FIG. 2.
Figure 5:
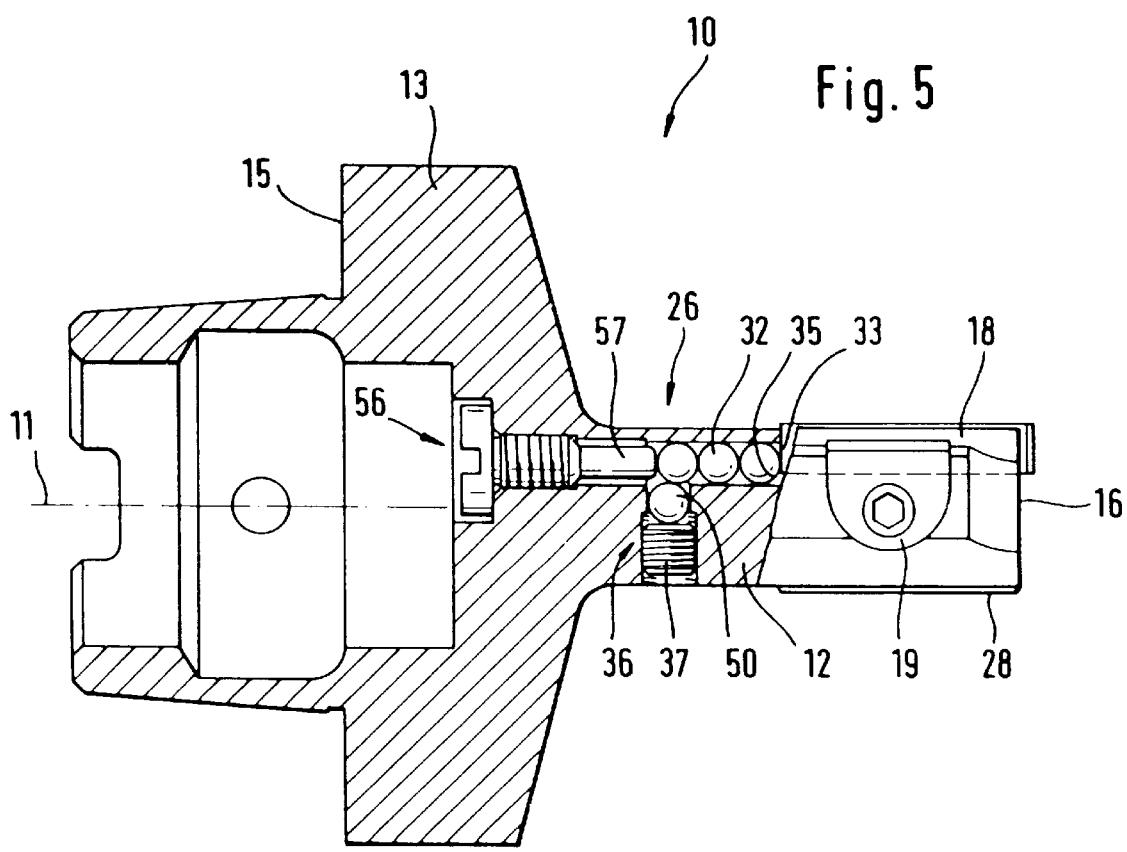
FIG. 5 shows a schematic partial sectional view of an alternative embodiment of the forward region of a step reamer according to the invention.

Exact details are shown in the example of the axial adjustment means 26, 27 in FIGS. 2 and 4, and with respect to the alternative in FIG. 5.

An axial guide section 31 is provided at the mouth of the guide slot 17, and receives a spherical force exerting element 32. This spherical force exerting element 32 is a steel ball, as used, for example, in ball bearings. The ball 32 is axially movable in the guide section 31, and abuts on an end face 33 of the cutting blade 18. A second guide section 34 is provided at right angles to the guide section 31, and runs radially outward as far as the outside surface of the base body. A second force exerting element 36 is disposed in this guide section 34 and is axially displaceable by means of an adjusting means 37 constructed as a set screw. The adjusting means 37 has a recess in which a tool can be positively positioned to effect the adjustment. The guide section 34 is formed as a bore which has a fine thread 38 in a radially outer region, to receive the adjusting means 37. It is adjoined by a bore section 40 with a cylindrical wall, in which the force exerting element 36 in the form of a pin is radially movable. So that tilting can be avoided, and an easy adjustment of the axial adjustment device 26, 27 is given, relatively tight tolerances are provided between the bore 40 and cylindrical force exerting element 36. At its end which faces the ball 32, the force exerting element 36 has a wedge surface 39 or inclined surface which engages the ball 32. The force exerting element is moved towards the ball 32 by the advance of the adjusting means 37, so that the ball 32 is moved axially onto the end face 33 of the cutting blade 18 by the wedge action between the wedge surface 39 and the ball 32. Force is thus applied to the ball 32 at an angle of about 45°. An axial adjustment device 26, 27 in which only minimal frictional forces have to be overcome is thus provided by the point contact between the wedge surface 39 and the ball 32, and also the guide section 31 and the ball 32, and furthermore the end face 33 and the ball 32. The cutting blade can be moved, sensitively and precisely, parallel to the axis in a direction towards the end face 16 of the base body 12.

The accuracy of the axial adjustment device is in the range of hundredths of a millimeter. An adjusting screw 37, constructed as a set screw having a fine thread, is advantageously provided for this purpose. A very fine adjustment can thereby be obtained, and can be directly transmitted by means of the force exerting element 32, 36.

For the simple production of a guide section 31, a portion of the guide section is milled with a milling tool in the radial direction in the base body 12, and subsequently is formed into a guide section 31 by a cover plate 41 and a releasable screw connection 42. The cover plate 41 advantageously has a U-shaped recess 47 in the direction towards the end face 16 and at least partially encompassing the cutting blade 18 at the mouth of the guide slot 17. This moreover has the advantage that the size of the displacement region for the axial displacement can be enlarged. Furthermore, it can be assured that the ball 32 can be kept in the guide section 31 when the displacement is at a maximum. The guide section (31) may be slightly inclined inward with respect to the rotation axis (11) of the shaft tool (10).

The cover plate 41 has a radially inward facing flange 44 whereby it is assured that on positioning, the cover plate 41 can be positioned in a recess 46 of the base body 12, and the forces of the adjustment device 26, 27, which act axially and radially, can be received with certainty. The guide surface 47 of the cover plate 41 facing the force exerting element 32 is advantageously made in a circular arcuate shape and matches the spherical diameter of the force exerting element 32.

The guide bars 28 can be made longer than the cutting blade 18, depending on the case of application. In order to construct an axial adjustment device 26, 27 of the kind shown in FIG. 2, in which only one ball-shaped force exerting element 32 is used, it is advantageously provided according to FIG. 4 that the guide section 34 which runs radially outward is provided at an angle a so that the guide bar 28 can be constructed in its required length and can go past the guide section 34.

Alternatively, the guide section 31 can be made longer; several force exerting elements 32 can then be arranged one behind the other, so that the guide section 34 which runs radially outward can run outward at an optional angle without its course being limited by the guide bars 28.

An advantageous embodiment of the guide section 31 can be given by an inward inclination of the longitudinal axis of the guide section towards the rotation axis 11. The force exerting element 32 can thereby act from outside to inside on the end face 33 of the cutting blade 18, so that during the axial displacement, the cutting blade 18, lightly clamped in the guide slot 17, is moved only in the axial direction, and a radially outward deviation can be prevented.

Alternatively, an angled arrangement of the end face 33 can likewise be provided, as is shown by dashed lines in FIG. 2.

In FIG. 2, the cutting blade 18 is shown in an end position, in which the end face 33 lies on the bottom of the U-shaped recess 43. On an advance of the adjusting means 37, the force exerting element 36 moves radially towards the ball 32, so that the radial advancing movement is converted by the wedge surface 39 into an axial movement of the ball 32 in the direction towards the end face 16 of the base body 12. A maximum axial setting is then given when the wedge surface 39 of the force exerting element 36 just abuts tangentially on the ball 32. An intermediate position 49 is shown dashed, in which an axial displacement has taken place according to the distance A.

In the axial adjustment device 26, 27, care has to be taken that the wedge surface 39 of the force exerting element 36 has at least a length which corresponds to the diameter of the ball-shaped force exerting element 32, so that the maximum displacement path can be made use of. Furthermore, the wedge surface 39 of the force exerting element 36 should not be over dimensioned, so as not to weaken the base body 12 by the then required size of the guide section 34.

Alternatively it can likewise be provided that the force exerting element 32 is individually or plurally arranged in the guide section 31 which acts on the force exerting element 32, wherein the pin 40 has a spherical or hemispherical contact surface on the end facing the end face 33 of the cutting blade 18.

An alternative form of the axial adjustment device 26, 27 is shown in FIG. 5. The guide section 31 is constructed as a bore which is axially parallel to the rotation axis 11. The balls 32 can be introduced, seen from the end annular surface 15, into the guide section 31, which is closed by means of a closure element 56 which is preferably constructed as a screw. The closure element 56 is advantageously glued into the guide section 51, so as to prevent an inadvertent loosening. The adhesive connection is provided such that the adhesive connection can be released with a tool and the closure element 56 can be screwed out of the guide section 13. The closure element 56 has a section 57 in the form of a pin, facing towards the axial adjustment device 26, 27 and projecting, at least partially, into the radial guide section 34. It is thereby provided that the section 57 in the form of a pin projects so far into the guide section 34 that the rotation axes of the force exerting elements 32 and 36 are arranged at a mutual offset, so that an introduction of the force at the force exerting element 32, likewise constructed as a ball, can take place at an angle between 89° and 1°.

Figure 3:
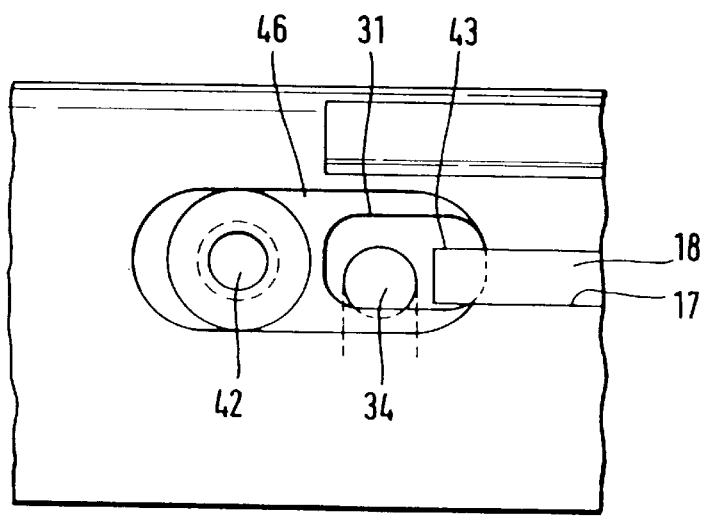
FIG. 3 shows a plan view of the region 2, seen in the direction of the arrow 3 in FIG. 1.

The guide section 31 is made longer in this embodiment and receives, for example, three balls 32. With longer guide sections 31, 34 it can likewise be provided that a combination of both force exerting element 32, 36 is provided in one guide section 31, 34. A force exerting element 36 in the form of a pin can thus be readily matched to the length of the guide section 31, 34 without a suitable diameter or cross section of the guide section 31, 34 having to be changed. In this way, with this embodiment, an angled arrangement of the guide section 34 seen in cross section, as is illustrated in FIG. 4, can be dispensed with. The axial adjustment means 26, 27 takes place analogously to the axial displacement 26, 27 described in FIGS. 2–4.

Alternatively, for the axial adjustment device 26, 27, the guide section 34 can be provided at an angle which deviates from 90° to the guide section 31. Moreover, the axial adjustment device 26, 27 can be provided for a step tool 10 with which wide steps are to be machined, by means of which a blade can be aligned perpendicularly to the axis of the drill. Thus the axial adjustment means can be used as a radial adjustment for setting the drill radius.

It is common to all the embodiments that the adjusting means 37 is freely accessible from the exterior. Moreover such an adjustment device 26, 27 can be provided for single blade reamers, step tools, and fine bore tools, as well as for shaft tools, which receive the cutting blade in a cassette.

I claim:

1. A rotating shaft tool, comprising:
   a body (12) having a guide slot (17) in which at least one elongated cutting blade (18) can be arranged,
   an axial adjustment device (26, 27) arranged at the mouth of said guide slot (17) by means of which said cutting blade (18) can be adjusted axially in said guide slot (17),
   wherein said axial adjustment device (26, 27) comprises:
   at least a first force exerting element (32) with at least one rounded contact surface (35) positioned towards an end face (33) of said cutting blade (18) for moving said cutting blade (18) in an axial direction, and
   at least one second force exerting element (36) for adjusting said first force exerting element (32), which second force exerting element (36) deviates from the direction of movement of said first force exerting element (32),
   in which said first force exerting element (32) is guided axially with respect to said guide slot (17).

2. A rotating shaft tool according to claim 1, wherein said contact surface of said first force exerting element (32) is spherical.

3. A rotating shaft tool according to claim 1, wherein said first force exerting element (32) is in the form of a pin with a rounded contact surface (35) arranged towards said end face (33) of said cutting blade (18).

4. A rotating shaft tool according to claim 1, wherein said second force exerting element (36) exerts force against said first force exerting element (32) at an angle in the range between one degree and eighty-nine degrees.

5. A rotating shaft tool according to claim 1, wherein said second force exerting element (36) exerts force against said first force exerting element (32) at an angle equal to or less than fifty degrees.

6. A rotating shaft tool according to claim 1, wherein said second force exerting element (36) exerts force against said first force exerting element (32) at an angle of about forty-five degrees.

7. A rotating shaft tool according to claim 1, wherein said first force exerting element (32) is arranged in a first guide (31) that is axially parallel to the axis of rotation (11) of said rotating shaft tool.

8. A rotating shaft tool according to claim 7, wherein said first guide (31) comprises a bore for receiving said at least one first force exerting element (32).

9. A rotating shaft tool according to claim 1, wherein said body (12) has an outwardly open recess (46) located at the mouth of said guide slot (17), further comprising a cover element (41) for closing said recess (46) to form a first guide (31) for said first force exerting element (32).

10. A rotating shaft tool according to claim 1, wherein said first force exerting element (32) comprises a steel ball.

11. A rotating shaft tool according to claim 1, wherein said second force exerting element (36) is arranged in a guide (34) that extends substantially radially with respect to said axial adjustment device (26, 27).

12. A rotating shaft tool according to claim 11, wherein said second force exerting element (36) comprises a pin (40) axially movable in said radially extending guide (34) and has a wedge surface (39) facing towards a first guide (31) that is axially parallel to the axis of rotation (11) of the rotating shaft tool for guiding said first force exerting element (32).

13. A rotating shaft tool according to claim 1, wherein said second force exerting element (36) comprises a steel ball.

14. A rotating shaft tool according to claim 11, further comprising an adjusting element (37) arranged in said radially extending guide (34) for displacing said second force exerting element (36) axially in said second guide (34).

15. A rotating shaft tool according to claim 14, wherein said adjusting element (37) comprises a set screw.

16. A rotating shaft tool according to claim 1, wherein said end face (33) of said cutting blade (18) extends outwardly at right angles to the axis of rotation (11) of said rotating shaft tool.

17. A rotating shaft tool according to claim 7, wherein a plurality of first force exerting elements (32) are arranged one behind the other in said first guide (31).

18. A rotating shaft tool according to claim 11, wherein a plurality of first force exerting elements (32) are arranged one behind the other in said axially parallel guide (31).

19. A rotating shaft tool according to claim 1, wherein the diameter of said first force exerting element (32) determines the maximum displacement range of said axial adjustment device (26, 27).

20. A rotating shaft tool according to claim 11, further comprising a plurality of guide bars (28) affixed to said rotating shaft tool, wherein said second guide (34) extends radially outward in said rotating shaft tool between said guide bars.

21. A rotating shaft tool, comprising:
- a body (12) having a guide slot (17) in which at least one elongated cutting blade (18) can be arranged,
- an axial adjustment device (26, 27) arranged at the mouth of said guide slot (17) by means of which said cutting blade (18) can be adjusted axially in said guide slot (17),
- wherein said axial adjustment device (26, 27) comprises:
    - at least a first force exerting element (32) with at least one rounded contact surface (35) positioned towards an end face (33) of said cutting blade (18) for moving said cutting blade (18) in an axial direction, and
    - at least one second force exerting element (36) for adjusting said first force exerting element (32), which second force exerting element (36) deviates from the direction of movement of said first force exerting element (32),
- wherein said end face (33) of said cutting blade (18) extends at an angle of less than ninety degrees to said guide slot (17).

22. A rotating shaft tool, comprising:
- a body (12) having a guide slot (17) in which at least one elongated cutting blade (18) can be arranged,
- an axial adjustment device (26, 27) arranged at the mouth of said guide slot (17) by means of which said cutting blade (18) can be adjusted axially in said guide slot (17),
- wherein said axial adjustment device (26, 27) comprises:
    - at least a first force exerting element (32) with at least one rounded contact surface (35) positioned towards an end face (33) of said cutting blade (18) for moving said cutting blade (18) in an axial direction, and
    - at least one second force exerting element (36) for adjusting said first force exerting element (32), which second force exerting element (36) deviates from the direction of movement of said first force exerting element (32),
    - wherein said first force exerting element (32) is arranged in a first guide (31) that is at least slightly inclined inward with respect to the axis of rotation (11) of said rotating shaft tool.

* * * * *